(No Model.)
F. SCHAFSTALL.
FLOUR RECEPTACLE.
No. 458,192. Patented Aug. 25, 1891.
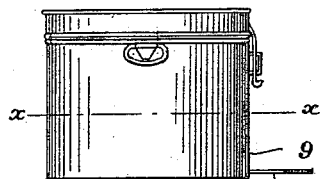
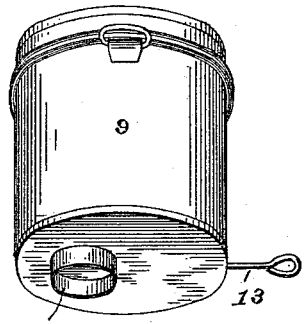
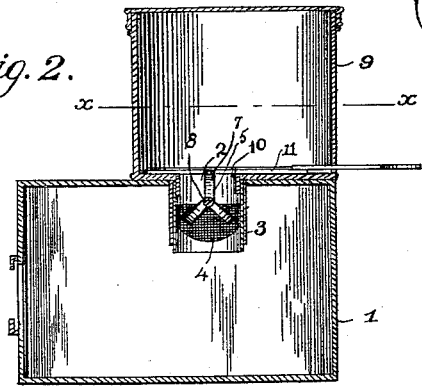
Witnesses
J. Ulke Jr.
H. F. Riley
Inventor
Frank Schafstall.
By his Attorneys,
C. A. Snow & Co.

UNITED STATES PATENT OFFICE.

FRANK SCHAFSTALL, OF SUMNER, IOWA.

FLOUR-RECEPTACLE.

SPECIFICATION forming part of Letters Patent No. 458,192, dated August 25, 1891.

Application filed April 16, 1891. Serial No. 389,192. (No model.)

*To all whom it may concern:*

Be it known that I, FRANK SCHAFSTALL, a citizen of the United States, residing at Sumner, in the county of Bremer and State of Iowa, have invented a new and useful Flour-Receptacle, of which the following is a specification.

The invention relates to improvements in flour-bins.

The object of the present invention is to provide a simple and inexpensive flour-receptacle, in which the hopper for holding flour to be sifted may be readily removed from the bin and sifter for the purpose of filling it or to clean the sifter.

A further object of the invention is to provide means for cutting off the flour and preventing the same passing to the sifter when so desired.

The invention consists of the construction and novel combination and arrangement of parts hereinafter fully described, illustrated in the accompanying drawings, and pointed out in the claim hereto appended.

In the drawings, Figure 1 is a side elevation of a bin and sifter embodying the invention. Fig. 2 is a vertical longitudinal sectional view. Fig. 3 is a transverse sectional view. Fig. 4 is a horizontal sectional view on the line $x$ $x$ of Fig. 2. Fig. 5 is a detail perspective view of the removable hopper to show the circular flange on the bottom.

Referring to the accompanying drawings, 1 designates a bin, which is adapted to contain sifted flour and is rectangular in section, and is provided in its top with a circular opening 2 and has depending from the circular opening a cylindrical sleeve 3. The cylindrical sleeve 3 is arranged within the bin and contains a semi-spherical wire-gauze screen or sieve 4, above which operates an agitator 5, consisting of disks 6 and curved bars 7, connecting the disks and adapted during the operation of the agitator to come in contact with the sieve and pass over the same. The agitator is mounted upon a shaft 8, and is arranged to break all lumps in flour and to cause the latter to pass through the sieve, and the shaft 8 is journaled in the bin and the depending sleeve and is provided at one end with a crank-handle, by means of which the agitator is operated.

The sieve receives flour from a cylindrical hopper 9, arranged above the opening 2 and provided in its bottom with an opening adapted to register with the sieve-opening, and the bottom of the hopper is provided with a depending cylindrical flange 10, which when the hopper is in position is arranged within the opening of the bin and prevents the escape of flour.

The flour of the hopper is retained therein when desired, and the discharge stopped by a cut-off consisting of a plate 11, arranged in guides or ways 12 on the inner face of the bottom of the hopper and adapted to close the opening. The plate 11 is operated by a wire or rod 13, which extends through an opening in the side of the hopper. The cut-off is also very useful when it is desired to remove the hopper to fill the same. The hopper is provided with a hinged top or cover and has oppositely-disposed handles, by means of which the hopper may be conveniently carried.

What I claim is—

The combination of the bin provided with an opening 2 in its top and having the cylindrical sleeve depending therefrom, the sieve arranged in the sleeve, the agitator, the removable hopper adapted to contain the flour to be sifted and having an opening in its bottom and provided with a depending cylindrical flange arranged to fit within the opening of the bin, the cut-off consisting of the plate arranged in ways on the bottom of the hopper and adapted to close the opening thereof, and the rod secured to the plate and extending through an opening in the side of the hopper, substantially as described.

In testimony that I claim the foregoing as my own I have hereto affixed my signature in presence of two witnesses.

FRANK SCHAFSTALL.

Witnesses:
B. F. FIESTER,
JOHN REAUN.